July 25, 1967   R. H. NORTH ET AL   3,332,518
DISC BRAKE CALIPER HAVING AN OUTWARDLY ACTUATED WHEEL CYLINDER
Filed Feb. 4, 1965   3 Sheets-Sheet 1

INVENTORS
Reginald H. North
John W. Stafford
Walter H. Zimmerman
BY
Donald P. Schrecki
THEIR ATTORNEY INVENTORS
Reginald H. North
John W. Stafford
Walter H. Zimmerman
BY
Donald P. Selwicki
THEIR ATTORNEY July 25, 1967  R. H. NORTH ET AL  3,332,518
DISC BRAKE CALIPER HAVING AN OUTWARDLY ACTUATED WHEEL CYLINDER
Filed Feb. 4, 1965  3 Sheets-Sheet 3

INVENTORS
Reginald H. North
John W. Stafford
Walter H. Zimmerman
BY
Donald P. Schrecki
THEIR ATTORNEY United States Patent Office 3,332,518
Patented July 25, 1967

3,332,518
DISC BRAKE CALIPER HAVING AN OUTWARDLY ACTUATED WHEEL CYLINDER
Reginald H. North, Headington, Oxford, England, and John W. Stafford, Royal Oak, and Walter H. Zimmerman, Rochester, Mich., assignors to General Motors Corporation, Detroit, Mich., a corporation of Delaware
Filed Feb. 4, 1965, Ser. No. 430,354
7 Claims. (Cl. 188—18)

This invention relates to disc braking mechanisms and more particularly to a caliper-type disc brake arrangement wherein the actuator lever is operated in scissor-like fashion.

It is an object of the present invention to provide an improved disc braking mechanism which is mounted in a caliper manner with respect to the disc and in which an actuating cylinder is integrally formed with one of the actuating levers.

It is an other object of the present invention to provide an improved disc brake mechanism wherein the caliper mounting arrangement for the actuating levers is integrally formed with a steering mechanism of a vehicle.

It is still another object of the present invention to provide an improved disc brake mechanism wherein the friction pads are resiliently carried by actuating levers and wherein the friction pads are returned to a poised position away from the rotating disc by spring means acting on actuating levers.

Further objects and advantages of the present invention will be apparent from the following description, reference being had to the accompanying drawings wherein a preferred embodiment of the present invention is clearly shown.

Figure 1:
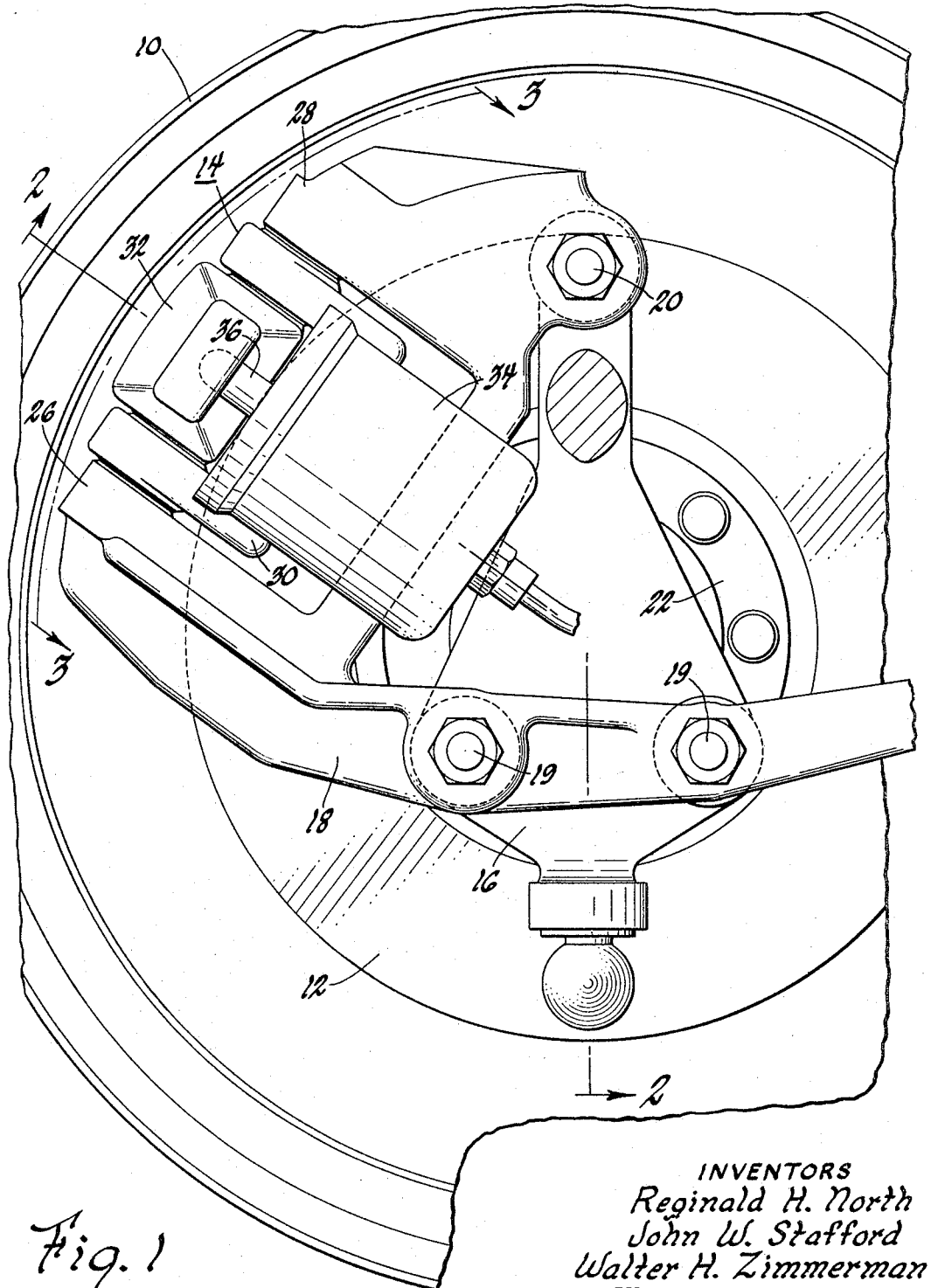
FIGURE 1 is an elevational view of an inside portion of a vehicle wheel with the subject invention mounted in its operative environment.

Referring now to FIGURE 1, a vehicle wheel 10 is illustrated as carrying a disc 12, arranged to rotate therewith, and a disc brake assembly, generally designated by the numeral 14, arranged to provide a braking action against the disc 12. A steering knuckle 16 is bolted to the vehicle wheel 10 in a conventional manner and is illustrated as being also bolted to a caliper mounting bracket 18 at points 19. The mounting bracket 18 is additionally secured to the wheel 10 at point 20 to provide stability at the end furthest removed from the points 19. It should be noted that the caliper mounting bracket 18 also serves as a steering arm for the front wheels of the vehicle.

Figure 2:
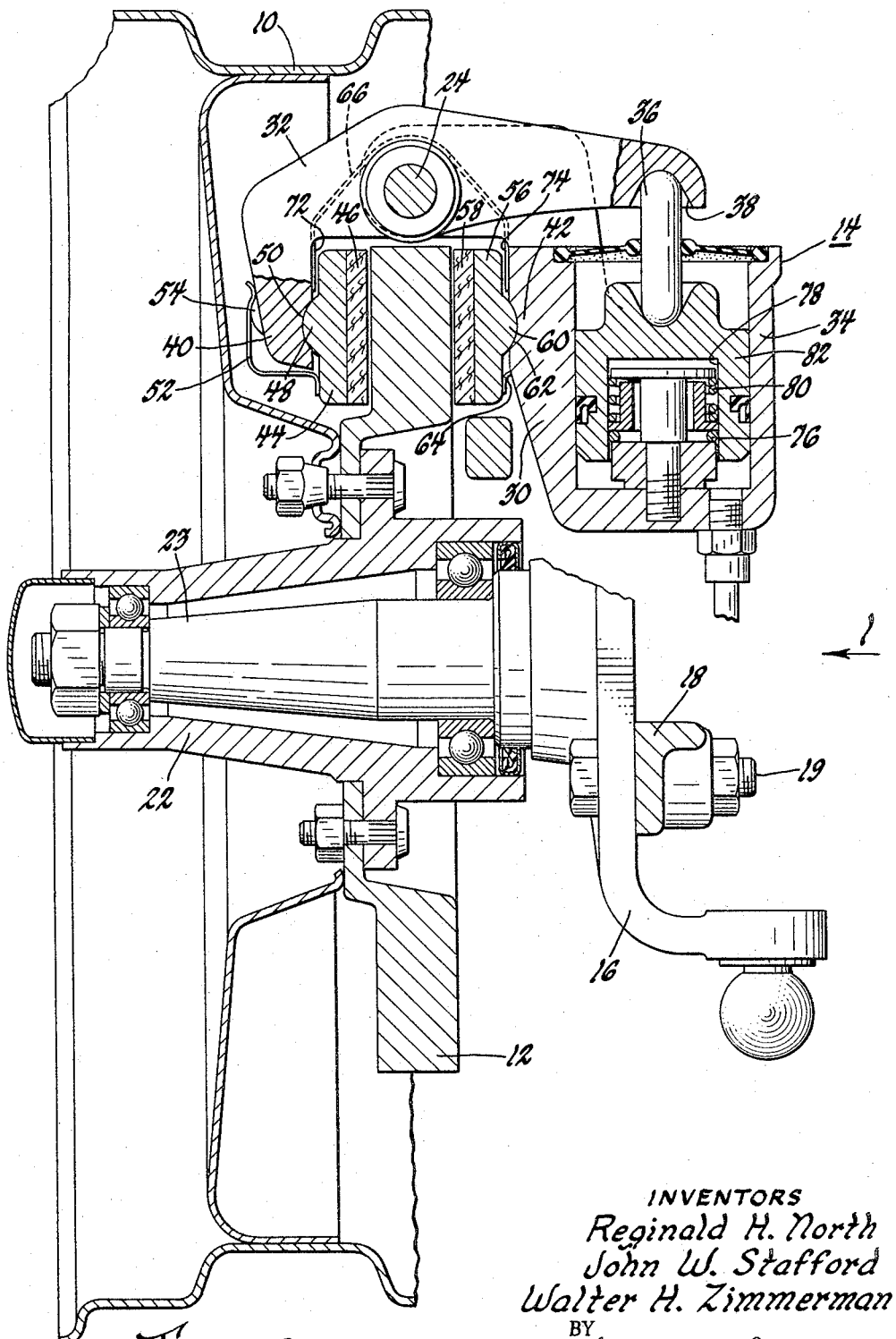
FIGURE 2 is a sectional view taken along line 2—2 of FIGURE 1.

Referring now to FIGURE 2, the wheel 10 is illustrated as being secured to a wheel hub 22 in a conventional manner wherein the disc 12 is operatively positioned between the hub 22 and the wheel 10. It is clear from FIGURE 2 that the hub, the wheel and the disc rotate as a unit around a spindle 23, and the disc brake assembly 14 is fixed with respect to the rotating hub, disc and wheel.

A pivot bolt 24 is carried by the caliper mounting bracket 18 and constitutes a bridge between opposed portions 26 and 28 of the bracket 18. The pivot bolt is more clearly shown in FIGURE 3. Referring to FIGURE 2, a lever 30 and a lever 32 are pivotally supported on the pivot bolt 24. An hydraulic cylinder 34 is integrally formed with the lever 30 and includes an output member 36 engaging a pocket 38 formed in one end of the lever 32. Thus, it is obvious that the pressure build-up in the hydraulic cylinder 34 will cause a scissor-like action between the levers 30 and 32, causing opposed portions 40 of the lever 32 and portion 42 of the lever 30 to be drawn toward the disc 12.

A friction element 44 carrying a friction pad 46 includes an integrally formed part spherical portion 48 extending for the complete length of the pad and arranged to co-operate with a part spherical groove 50 formed in the lever 32, and extending for its complete length. A spring clip 52, attached to the friction element 44 in any well-known manner, engages a lug 54 integrally formed on the lever 32.

A friction element 56 carries a pad 58 in juxtaposition to the disc 12 in a manner similar to the positioning of the pad 46. A part spherical portion 60, integrally formed with the friction element 56, is held in a groove 62 formed in the lever 30 by a spring clip 64 in the same manner as that described for the element 44.

Figure 3:
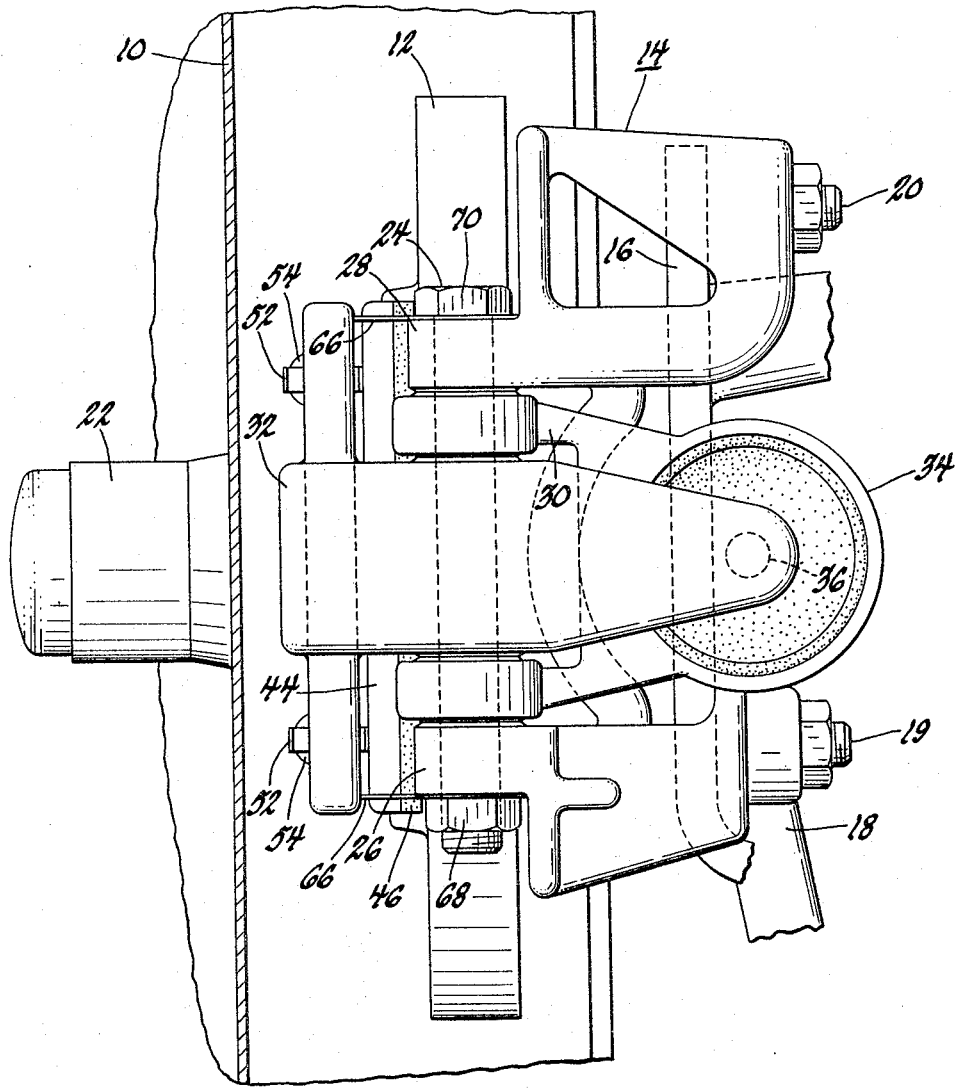
FIGURE 3 is a partial elevational view of the subject invention taken along line 3—3 of FIGURE 1.

The levers 30 and 32 are biased away from the disc 12 by a retractor spring 66, carried between ends 26 and 28 of the bracket 18, and bolts 68 and 70 engaging tapped ends of the pivot bolt 24. It is seen in FIGURE 3 that the two retractor springs 66 are non-rotatable with respect to the pivot bolt 24 and are comprised of outwardly extending legs 72 and 74 bearing against the levers 30 and 32 as best seen in FIGURE 2.

The hydraulic cylinder 34 has a friction element 76 positionable on an inside bore 78 of the piston 82 during a brake actuation if wear on the friction pads 46 and 58 has progressed to a point requiring a pad adjustment. A certain predetermined clearance is desired between the pads 46 and 58 and the disc 12. The biasing force of the retractor springs 66 is controlled by the position of the friction element 76 on the bore 78. It is understood that the combined force of the retractor springs 66 is insufficient to reposition the friction element 76 on the bore 78. Therefore, when the friction element 76 is positioned during a brake actuation, a spring 80 will return a piston 82 to a point where the desired clearance will be maintained between the pads and the disc regardless of the wear experienced on the pads at that time. The operation of the cylinder 34 and piston 82 is more completely explained in FIGURE 2 of the co-pending application Ser. No. 420,980, now abandoned, assigned to the assignee of the present invention. Therefore, the amount of retraction of the spring 66 is controlled by the automatically adjusting cylinder 34 and, consequently, the output member 36 is maintained in biased engagement with the piston 82 and the pocket 38 by the force of the friction element 76 holding against the return tendency of the spring 66.

In operation, a pressure build-up is caused in the cylinder 34 by the pressurization of a vehicle braking system in a conventional manner. The piston 82 will be driven toward the lever 32. The output member 36 engaging the lever 32 will cause it to pivot about the pivot bolt 24 and the reaction force will cause a like pivoting of the lever 30 about the pivot bolt 24 in an opposite direction. It is thus seen that a scissor-like action is generated which will drive the friction pads 46 and 58 into engagement with the disc 12, thereby resulting in a braking action due to pads 46 and 58 reacting on the abutment faces provided on the carrier bracket 18 causing the wheel 10 carrying the disc 12 to be rotationally impeded. When the pressure in the cylinder 34 is relieved, the retractor spring 66 will cause a reverse pivoting of the levers 32 and 30, resulting in a withdrawal of the pads 46 and 58 from the disc 12. At the same time, the pocket 38 of the lever 32 engaging the output member 36 will cause the piston 82 to be returned in the bore 78 until it contacts the friction ring 76. In this manner, the pads 46 and 58 will be maintained a pre-determined distance away from the disc 12 as determined by the position of the friction ring 76. As more clearly set forth in Ser. No.

420,980, now abandoned, the friction element or ring 76 is repositionable in the bore 78 as wear occurs on the pads 46 and 58, resulting in a constant desired clearance between the pads and the disc.

It should be noted that the part spherical portions 48 and 60, cooperating with the grooves 50 and 62 formed in the levers 32 and 30 respectively, automatically compensate for a change in the angular relationship of the levers 32 and 30 to the disc 12 as wear occurs in the pads 46 and 58.

The utility of the present invention is apparent in an operative environment wherein a caliper-type disc brake is advantageous and problems of space or economics demand the use of a single actuating cylinder. Economies are experienced in the integrating of the cylinder 34 and the lever 30 as well as providing for the integral construction of the bracket 18 and a steering arm of the vehicle. The reactive loads on the disc generated in the braking action are taken up by fixed portions of the vehicle and the addition of separate mounting brackets for the disc brake mechanism is made unnecessary.

While the embodiment of the present invention, as herein disclosed, constitutes a preferred form, it is to be understood that other forms might be adopted.

What is claimed is as follows:

1. A disc brake mechanism comprising: disc means carried by a vehicle wheel and arranged to rotate therewith; support means carried by a non-rotatable portion of the vehicle wheel and including a pivot portion; scissor means pivotally supported on said pivot portion of the support means and arranged in caliper fashion around a portion of the periphery of the disc means; fluid pressure means having a housing formed integrally with said scissor means and having an output portion drivably engaging said scissor means directly; and friction means carried by said scissor means and said fluid pressure means on opposite sides of said disc means and said housing laterally movable to drive said scissor means in response to a pressure build-up in said fluid pressure means to provide a braking action for the vehicle wheel.

2. A vehicle disc braking system comprising: a disc carried by a vehicle wheel and rotatable therewith; a pivot support; lever means pivotable on said pivot support in a scissor manner and including portions extending on opposite sides of said disc; an hydraulic cylinder having a body integrally formed with one of said lever means and drivably engaging another of said lever means; friction means carried by the portions of the lever means extending on opposite sides of said disc in juxtaposition to the rotatable disc; said friction means engageable with said disc in response to a scissor-like pivotal movement of said lever means as a pressure build-up occurs in said hydraulic cylinder to bring about a braking action on said rotatable disc with said cylinder body laterally moving to move said scissor means in clamping fashion, and return means engaging said lever means to bring said lever means and said friction means to a poised position as the pressure in the hydraulic cylinder is relieved.

3. A vehicle disc braking system comprising: a disc carried for rotation by the vehicle wheel; a support member having a pivot bolt, said pivot bolt being positioned longitudinally with respect to the outer periphery of the disc; a plurality of levers pivotally disposed in scissor fashion on said pivot bolt and including friction portions juxtaposed to opposite sides of the disc carried by each lever; an hydraulic cylinder integrally formed with one of said levers and having an output member drivably engaging another of said levers and another portion deflectible into one of said levers, said output member being responsive to a pressure build-up in said hydraulic cylinder to scissor said levers toward said disc; and return means engaging said calipers and carried by said support member to return said levers to a poised position relative to said disc when pressure is relieved in said hydraulic cylinder; said friction portions carried by said levers in juxtaposition to said disc and engageable therewith in response to movement of said levers to provide a braking action for the vehicle wheel.

4. A vehicle disc braking system according to claim 3 wherein the return means is at least one resilient member mounted on the pivot support and having projecting legs spaced apart a distance equal to the desired clearance of the levers from the rotatable disc, said projecting legs biasing the levers to a poised position after a brake actuation.

5. A vehicle disc braking system according to claim 3 wherein the friction means includes elements having friction material carried thereon, said elements having an integral spherical portion cooperating with a spherical pocket formed in said lever means, said elements being resiliently retained on said levers by spring clips engaging an opposite side of the levers from the spherical pocket.

6. A caliper disc brake assembly comprising: a disc; a support member being fixed relative to said disc; lever means pivotally supported on the outer periphery of said disc by said support member; force developing means integrally formed with one of said lever means and arranged to pivot therewith; at least two friction elements carried in juxtaposition to said disc, one of said friction elements carried by said lever means and another of said friction elements being carried directly by said force developing means; and return means carried by said support member and engaging said lever means to urge said lever means to a predetermined point on its pivotal axis, said lever means being responsive to a pressure increase in said force developing means to carry one of said friction elements into said disc to develop a braking action thereon and said force developing means acting by lateral deflection thereof to drive another of said friction elements into said disc.

7. A caliper disc brake assembly comprising: a disc carried by and rotatable with a vehicle wheel; a support member including a pivot bolt longitudinally positioned with respect to the outer periphery of said disc; lever means pivotally supported on said pivot bolt and including portions carried on opposite sides of said disc; pressure developing means integrally formed with one of said lever means being movable therewith and having an output member drivably engaging another of said lever means to move said lever means in scissor-like fashion relative to said disc to create a braking action when a pressure increase develops in said pressure developing means; friction means carried by portions of said lever means and by said pressure developing means on opposite sides of said disc; and return means carried by said support member and having resilient legs engaging said lever means to urge said lever means and said friction means to a predetermined clearance from said disc, said pressure developing means including means for adjusting the predetermined clearance between the friction means and said disc as wear occurs during repeated braking actions.

References Cited

UNITED STATES PATENTS 2,781,106 2/1957 Lucien _____ 188—73 X
2,827,132 3/1958 Buyze _____ 188—73

FOREIGN PATENTS 231,493 10/1960 Australia.
782,278 9/1957 Great Britain.

DUANE A. REGER, *Primary Examiner.*